(12) United States Patent
Sano

(10) Patent No.: US 7,669,897 B2
(45) Date of Patent: Mar. 2, 2010

(54) VEHICLE PASSENGER RESTRAINING APPARATUS AND METHOD FOR THE SAME

(75) Inventor: Maki Sano, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 215 days.

(21) Appl. No.: 11/693,084

(22) Filed: Mar. 29, 2007

(65) Prior Publication Data

US 2007/0296192 A1    Dec. 27, 2007

(30) Foreign Application Priority Data

Jun. 23, 2006    (JP) ............................. 2006-173846

(51) Int. Cl.
*B60R 21/045* (2006.01)

(52) U.S. Cl. .................... 280/752; 280/729; 280/730.1; 280/753

(58) Field of Classification Search .............. 280/730.1, 280/752, 753, 729
See application file for complete search history.

(56) References Cited

U.S. PATENT DOCUMENTS

| 4,417,750 A | 11/1983 | Burry |
| 5,513,877 A | 5/1996 | Brien et al. |
| 6,217,059 B1 | 4/2001 | Brown et al. |
| 6,916,042 B2 * | 7/2005 | Fukawatase et al. ........ 280/751 |
| 7,314,229 B2 * | 1/2008 | Kitagawa et al. ......... 280/730.1 |
| 2001/0033072 A1 | 10/2001 | Kumagai et al. |
| 2004/0094943 A1 * | 5/2004 | Fukawatase et al. ........ 280/753 |
| 2005/0098986 A1 * | 5/2005 | Kitagawa et al. ......... 280/730.1 |

FOREIGN PATENT DOCUMENTS

| DE | 102004038445 A1 | 3/2006 |
| EP | 1419939 A1 | 5/2004 |
| GB | 2243533 A | 11/1991 |
| GB | 2340458 A | 2/2000 |
| JP | 04-197847 A | 7/1992 |
| JP | 2679405 B2 | 11/1997 |
| JP | 10-071911 A | 3/1998 |
| JP | 2006-076418 | 3/2006 |
| WO | WO-2005/113299 A1 | 12/2005 |

* cited by examiner

*Primary Examiner*—Eric Culbreth
(74) *Attorney, Agent, or Firm*—Global IP Counselors, LLP

(57) ABSTRACT

A vehicle passenger restraining apparatus is provided that basically includes a knee angle restraining structure, a shin restraining structure and a groin angle restraining structure. The knee angle restraining structure is configured to restrain a passenger during a frontal collision to attain a posture with a prescribed knee angle as measured between a passenger's thigh and a passenger's shin. The shin restraining structure is configured to restrain the passenger during a frontal collision. The groin angle restraining structure is configured to restrain the passenger during a frontal collision to attain the posture with a prescribed groin angle as measured between the passenger's thigh with respect to a longitudinal axis passing through a rotational center of a passenger's groin joint.

15 Claims, 18 Drawing Sheets

CONTACT PRESSURE ACTING ON GROIN JOINT

VEHICLE PASSENGER RESTRAINING APPARATUS AND METHOD FOR THE SAME

CROSS-REFERENCE TO RELATED APPLICATIONS

This application claims priority to Japanese Patent Application No. 2006-173846, filed on Jun. 23, 2006. The entire disclosure of Japanese Patent Application No. 2006-173846 is hereby incorporated herein by reference.

BACKGROUND OF THE INVENTION

1. Field of the Invention

The present invention relates to a vehicle passenger restraining apparatus and passenger restraining method contrived to restrain a passenger by restraining the lower limbs (legs) of the passenger during a frontal collision.

2. Background Information

One example of a passenger restraining apparatus is disclosed in Japanese Laid-Open Patent Publication No. 2006-76418). In this publication, the passenger restraining apparatus accelerates restriction of a passenger's head during the frontal collision by increasing an absorption volume of the passenger's kinetic energy. This is accomplished by deploying a head airbag that expands between the passenger's head and the vehicle cabin and by deploying a leg air bag that expands between the passenger's legs and a vehicle body member.

SUMMARY OF THE INVENTION

As the above mentioned apparatus expands without controlling a contacting position with respect to the passenger during the collision, the above mentioned apparatus may reduce the head restriction force when a lower air bag contact point of the passenger's leg or a lower air bag contacting part of the passenger's inferior member jolts out of alignment.

One object of the present invention is to provide a vehicle passenger restraining apparatus and passenger restraining method that controls a posture of the passenger to reliably restrain the passenger's head during the frontal collision.

To attain the above mentioned object of the present invention, a vehicle passenger restraining apparatus is provided in accordance with the present invention that basically includes a knee angle restraining structure, a shin restraining structure and a groin angle restraining structure. The knee angle restraining structure is configured to restrain a passenger during a frontal collision to attain a posture with a prescribed knee angle as measured between a passenger's thigh and a passenger's shin. The shin restraining structure is configured to restrain the passenger during a frontal collision. The groin angle restraining structure is configured to restrain the passenger during a frontal collision to attain the posture with a prescribed groin angle as measured between the passenger's thigh with respect to a longitudinal axis passing through a rotational center of a passenger's groin joint.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
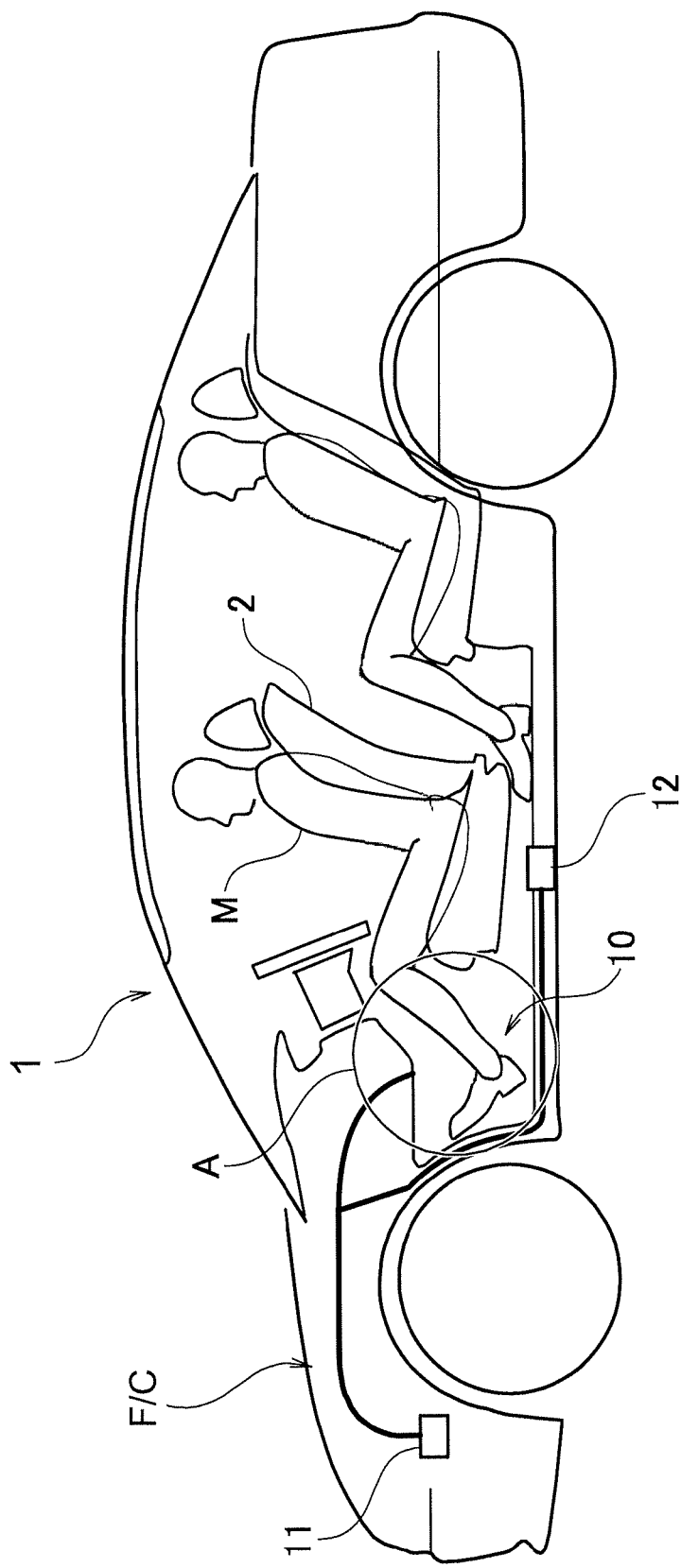
FIG. 1 is a simplified side elevational view of a vehicle in which a vehicle passenger restraining apparatus in accordance with a first embodiment.

Referring initially to FIGS. 1 to 9, a vehicle 1 is illustrated that is equipped with a vehicle passenger restraining apparatus 10 in accordance with a first embodiment. As shown in FIG. 1, the vehicle passenger restraining apparatus 10 in accordance with this embodiment is configured to restrain a passenger M sitting in a front seat 2 of the vehicle 1 during a frontal collision. The passenger restraining apparatus 10 is disposed in the portion A of the vehicle 1 as indicated in FIG. 1. A collision sensor 11 is arranged in a frontward portion of the cabin (front compartment F/C). The collision sensor 11 is configured to generate a frontal collision signal. The collision sensor 11 can be for example a deceleration sensor or pressure sensor. A controller 12 is arranged under the front seat 2 for controlling the passenger restraining apparatus 10 in response to the frontal collision signal.

Figure 2:
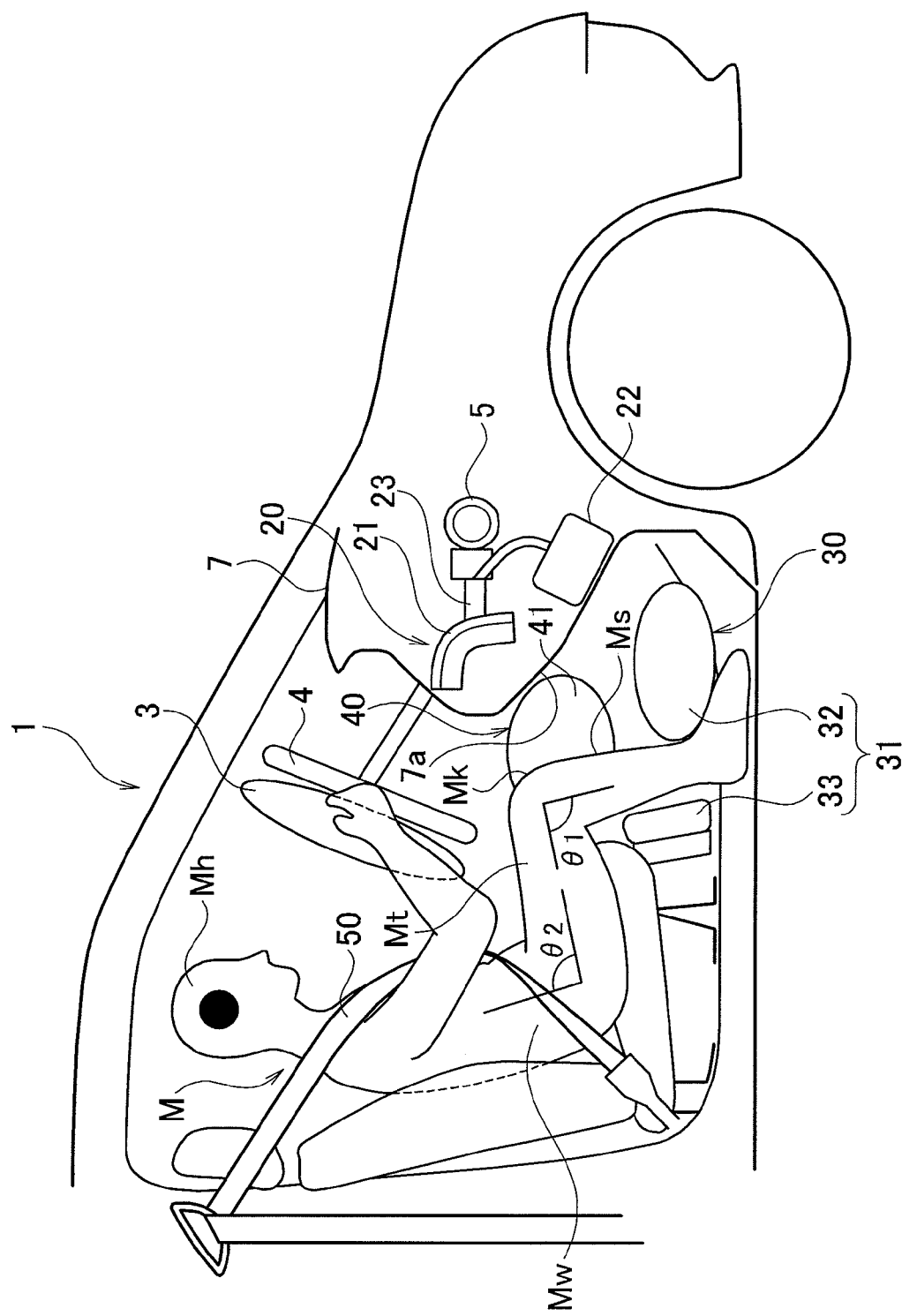
FIG. 2 is a simplified side elevational view of a front portion of the vehicle cabin, which illustrates an arrangement of the vehicle passenger restraining apparatus in accordance with the first embodiment.

As shown in FIG. 2, an air bag 3 is provided as a restraining structure that restrains a head Mh of the passenger M when the vehicle 1 undergoes a frontal collision. The air bag 3 is folded and stored inside a center portion of the steering wheel 4. The air bag 3 is configured to deploy and inflate as shown in FIG. 2 when a frontal collision occurs. The air bag 3 is designed to soften the impact when the passenger's head Mh contacts the steering wheel 4. A three-point seat belt device 50 is also provided on the front seat 2.

Figure 3:
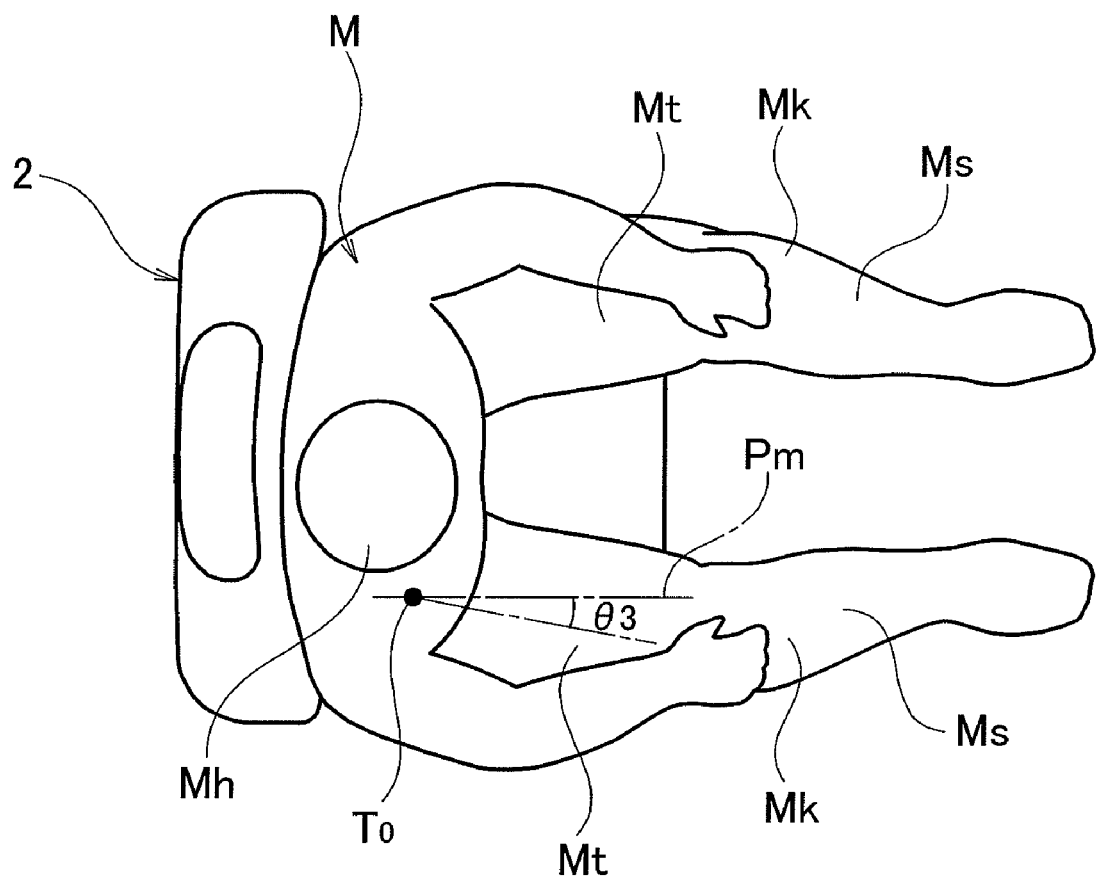
FIG. 3 is a simplified top plan view of a passenger seated in the vehicle equipped with the vehicle passenger restraining apparatus in accordance with the first embodiment.

As seen in FIG. 2, the passenger restraining apparatus 10 in accordance with this embodiment basically includes a knee angle restraining structure 20, a shin restraining structure 30 and a groin angle restraining structure 40. The knee angle restraining structure 20 restrains the passenger M during a frontal collision while controlling a prescribed angle (knee angle) $\theta 1$ made by a thigh Mt and a shin Ms of the passenger M. The shin restraining structure 30 restrains the passenger M during a frontal collision while controlling an angle (waist angle) $\theta 2$ made by the waist Mw and thighs Mt of the passenger M. As seen in FIG. 3, the groin angle restraining structure 40 restrains the passenger M during a frontal collision while controlling an angle (groin angle) $\theta 3$ made by a thigh Mt with respect to a longitudinal axis Pm passing through a rotational center To of a groin joint of the passenger M.

Also, a passenger restraining method in accordance with this embodiment is contrived to maintain a preferred posture of the passenger when a frontal collision occurs. This passenger restraining method employs the restraining structures 20, 30 and 40 to restrain the passenger M and to control the knee angle $\theta 1$, the waist angle $\theta 2$ and the groin angle $\theta 3$ of the passenger M during a frontal collision.

Figure 4:
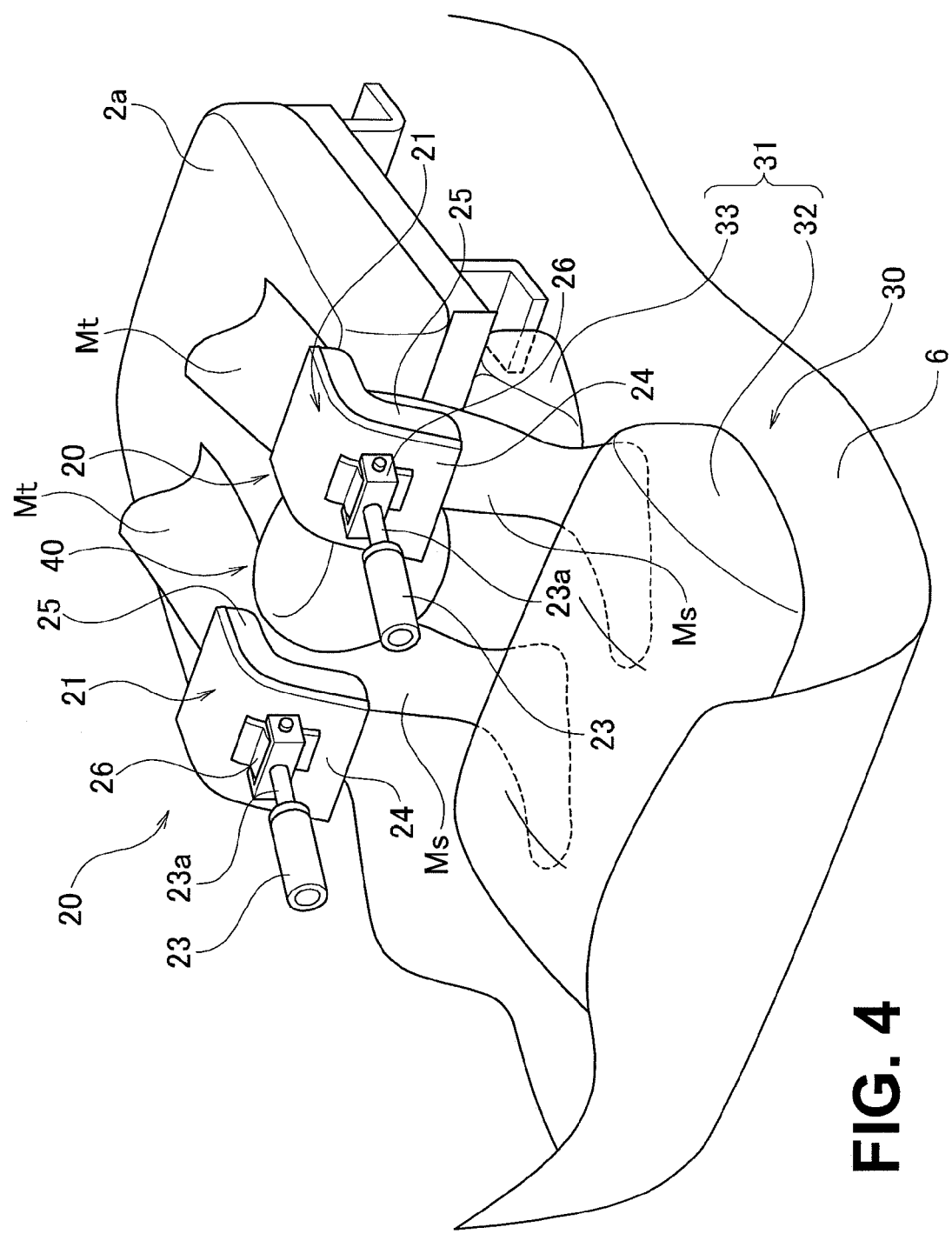
FIG. 4 is a simplified perspective view of a knee angle restraining structure and a shin restraining structure in accordance with the first embodiment.
Figure 5:
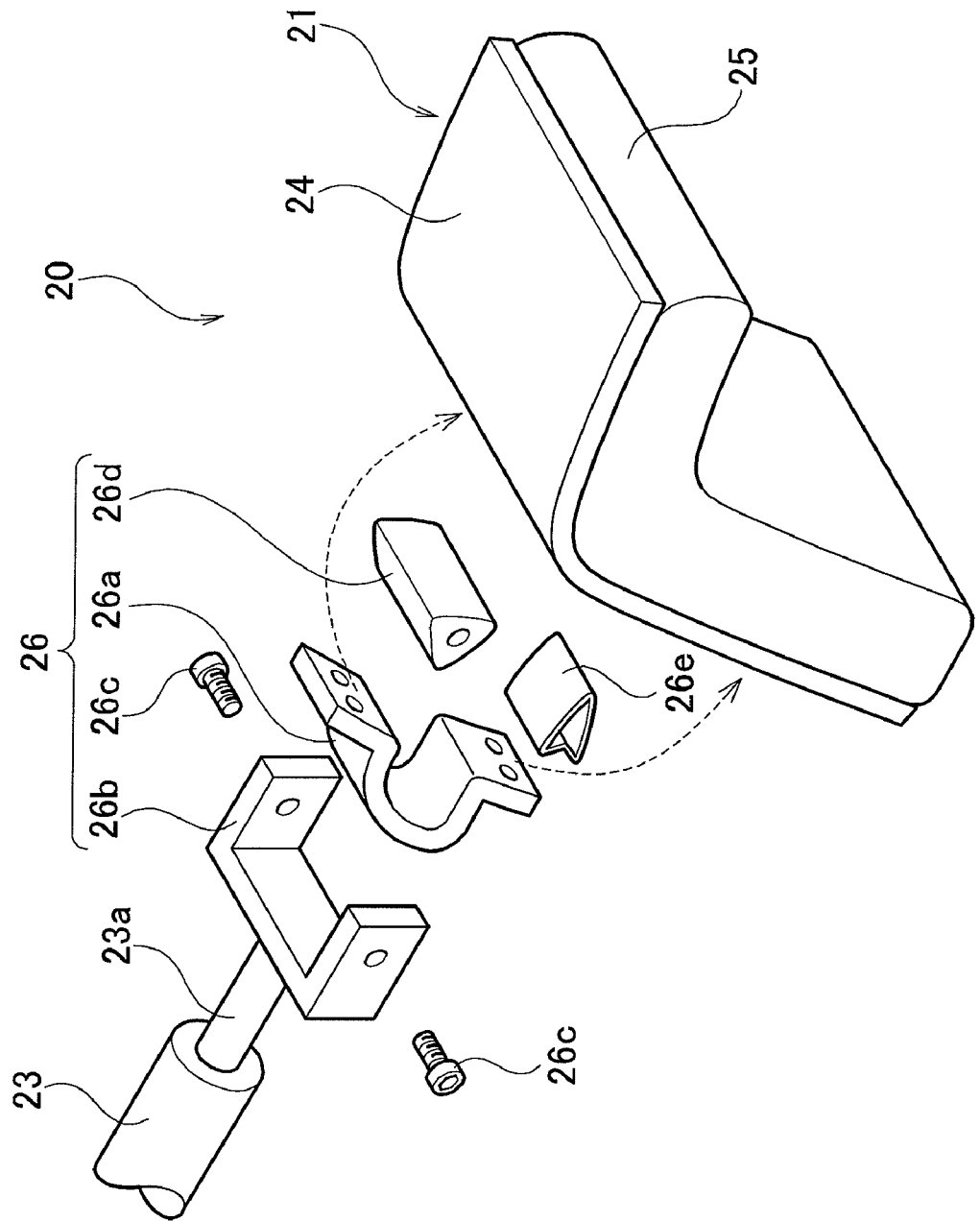
FIG. 5 is an exploded perspective view of a hinge section used in the knee angle restraining structure of the first embodiment.

As shown in FIGS. 2 and 5, the knee angle restraining structure 20 basically includes a pair of knee restraining pads 21, a pair of inflators 22 and a pair of extendable devices 23. The knee restraining pad 21 restrains an upper surface of a knee-ward end of the thigh Mt and a frontward surface of a knee-ward end of the shin Ms. The knee restraining pads 21 are mounted to a steering member 5 through the extendable devices 23. As seen in FIGS. 4 and 5, the extendable device 23 has a rod 23a that projects outward in a rearward direction of the vehicle. The extendable device 23 is extended by gas pressure produced by the inflator 22.

As shown in FIGS. 4 and 5, the knee restraining pad 21 has a support member 24 and a cushion 25. The support member 24 has a generally L-shaped form that follows the contour of the upper surface of the knee-ward end of the thigh Mt and the frontward surface of the knee-ward end of the shin Ms. The cushion 25 is mounted to the inward side of the support member 24 to face the passenger M. The support member 24 is mounted to the extendable device 23 through a hinge 26 such that it can pivot vertically about a horizontal axis.

As shown in FIG. 5, the hinge 26 basically includes a mounting bracket 26a, a C-shaped connecting bracket 26b, a pair of bolts 26c, a shaft member 26d and a triangular buffer member 26e. The mounting bracket 26a is connected to the frontward surface of the support member 24 and is shaped like the Greek letter Ω. The C-shaped connecting bracket 26b is connected to a tip end of the rod 23a of the extendable device 23. The C-shaped connecting bracket 26b straddles both sides of the mounting bracket 26a. The shaft member 26d has a triangular cross sectional shape, and is fitted inside the mounting bracket 26a. The C-shaped connecting bracket 26b is fastened to both ends of the connecting bracket 26b with the bolts 26c. The triangular buffer member 26e is a hollow member that is disposed between a bottom portion of the shaft member 26d and a bottom portion of the mounting bracket 26a. The buffer member 26e is configured such that when a vertical pivoting force equal to or larger than a prescribed pivoting force acts on the hinge 26, the buffer member 26e is crushed such that the energy can be absorbed.

The knee angle controlling member 20 is configured such that when the vehicle undergoes a frontal collision, the knee restraining pads 21 first contact the frontward surfaces of the knee-ward ends of the shins Ms and then pivots slightly in the vertical direction so as to contact the upper surfaces of the knee-ward end of the thighs Mt, thus controlling the knee angle $\theta 1$.

As shown in FIGS. 2 and 4, the shin restraining structure 30 basically includes a shin restraining device 31 that is configured and arranged to displace the shins Ms by a prescribed amount in the rearward direction of the vehicle 1. The shin restraining device 31 basically includes a front restraining air bag 32 and a rear restraining air bag 33. The front restraining air bag 32 serves as a front restraining part that contacts the frontward surface of the shins Ms during a frontal collision. The rear restraining air bag 33 serves as a rear restraining part that contacts the rearward surface of the shins Ms during a frontal collision. The front and rear restraining air bags 32 and 33 cooperate together to pinch the shins Ms from the front and rear in the longitudinal direction of the vehicle.

The front restraining air bag 32 is arranged in a frontward lower portion of the cabin, i.e., on a portion of the floor panel 6 in front of the passenger's feet, and the rear restraining air bag 33 is arranged under a frontward portion of the seat cushion 2a of the front seat 2. When the front restraining air bag 32 and the rear restraining air bag 33 are inflated during a frontal collision, the front restraining air bag 32 expands rearward from the frontward side of the shins Ms and the rear restraining air bag 33 expands frontward from the rearward side of the shins Ms. As a result, the shins Ms are pinched from the front and rear by the two restraining air bags 32 and 33. The amount of rearward expansion of the front restraining air bag 32 is larger than the amount of expansion of the rear restraining air bag 33 such that, overall, the shins Ms can be displaced in the rearward direction of the vehicle.

By restraining the shins Ms in such a fashion that they are displaced by a prescribed amount toward the rear of the vehicle, the upper body (torso) of the driver M is restrained from bending forward, and, thus the waist angle $\theta 2$ can be controlled.

The groin angle restraining structure 40 basically includes a groin spreading air bag 41 that pushes the knees Mk of the passenger apart by a prescribed amount as shown in FIGS. 2 and 4. The groin spreading air bag 41 is arranged in a front end portion of the seat cushion 2a. The groin spreading air bag 41 is configured to deploy and inflate when a frontal collision occurs in such a manner as to enter between the left and right knees Mk and force the knees Mk and thighs Mt apart by a prescribed amount.

The cushion 25 provided on the inward side of the knee restraining pad 21 and a compressible gas used as the gas inside the extendable device 23 provide an impact energy absorbing function of the knee angle restraining structure 20. Meanwhile, the cushioning quality of the shin restraining device 31 and the groin restraining air bag 41 provide an impact energy absorbing function of the shin restraining structure 30 and the groin angle restraining structure 40, respectively.

When the vehicle undergoes a frontal collision, the groin angle restraining structure 40, the shin restraining structure 30, and the knee angle restraining structure 20 operate sequentially in the order as listed. In other words, the groin angle restraining structure 40 operates first, the shin restraining structure 30 operates next, and the knee angle restraining structure 20 operates last.

Figure 6:
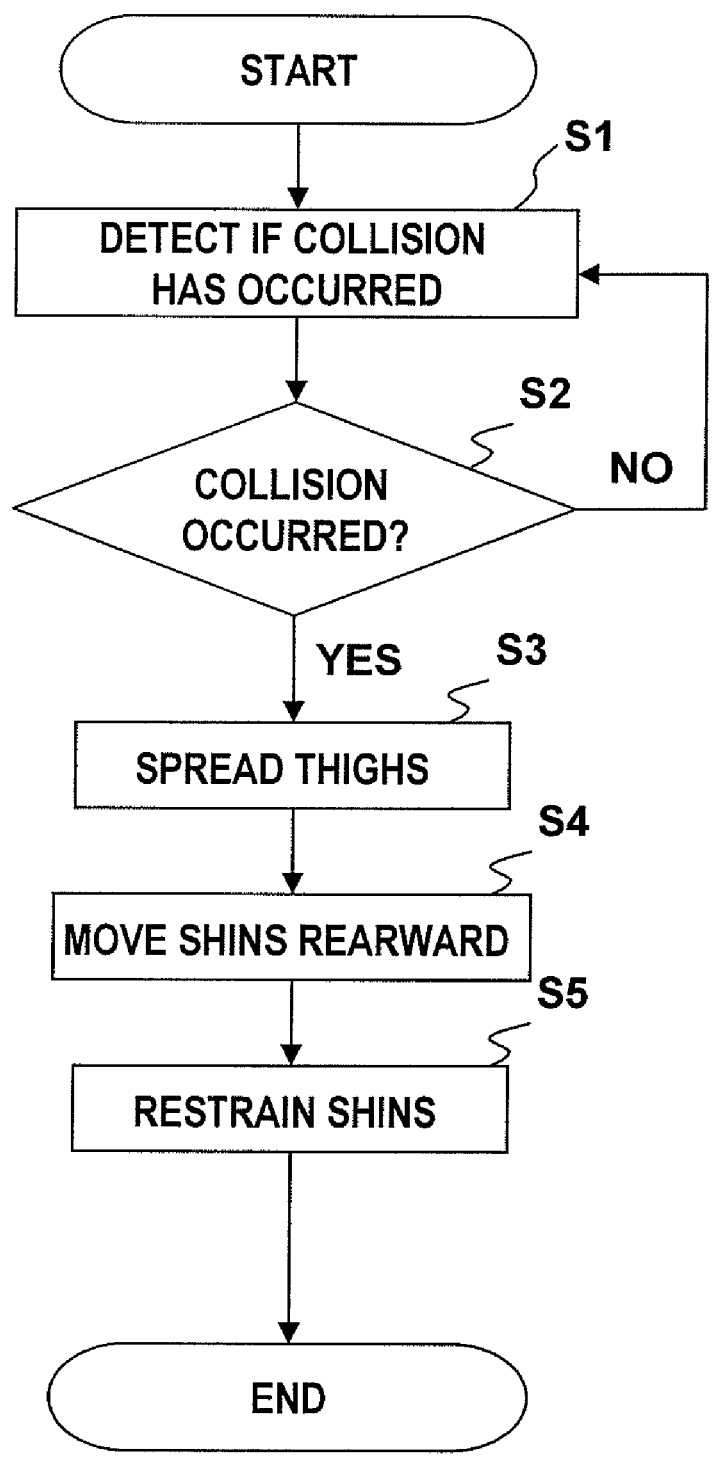
FIG. 6 is a control flowchart for the vehicle passenger restraining apparatus in accordance with the first embodiment.

More specifically, based on the detection signal issued by the collision sensor 11, the controller 12 controls the knee angle restraining structure 20, the shin restraining structure 30, and the groin angle restraining structure 40 in accordance with the flowchart shown in FIG. 6.

The control sequence of the flowchart starts when the ignition switch is turned on. In step S1, the controller 12 receives the signal from the collision sensor 11.

In step S2, the controller 12 determines if a frontal collision has occurred. If a collision has occurred, then the controller proceeds to step S3 and operates the inflator (not shown) of the groin spreading air bag 41. The groin spreading air bag 41 expands so as to spread the left and right thighs Mt and knees Mk apart.

In step S4, the controller 12 operates the inflator (not shown) of the shin restraining device 31. The front restraining air bag 32 and the rear restraining air bag 33 expands so as to displace the left and right shins Ms rearward.

In step S5, the controller 12 operates the inflator 22, thus causing the extendable devices 23 to project outward such that the knee restraining pads 21 restrain the knees Mk.

The front side members (not shown) are provided on both widthwise sides of the front compartment F/C. As shown in diagram (a) of FIG. 7, the collision sensor 11 detects the collision (impact) immediately after a front collision causing a tip end portion of a front side member to be crushed occurs. Then, during an intermediate stage of the collision during which the side members undergo deformation at longitudinally intermediate and rearward portions thereof, as shown in diagram (b) of FIG. 7, the air bag 3 begins to inflate and the groin spreading air bag 41, the shin restraining device 31, and the knee restraining pads 21 each operate successively in this order.

Figure 7:
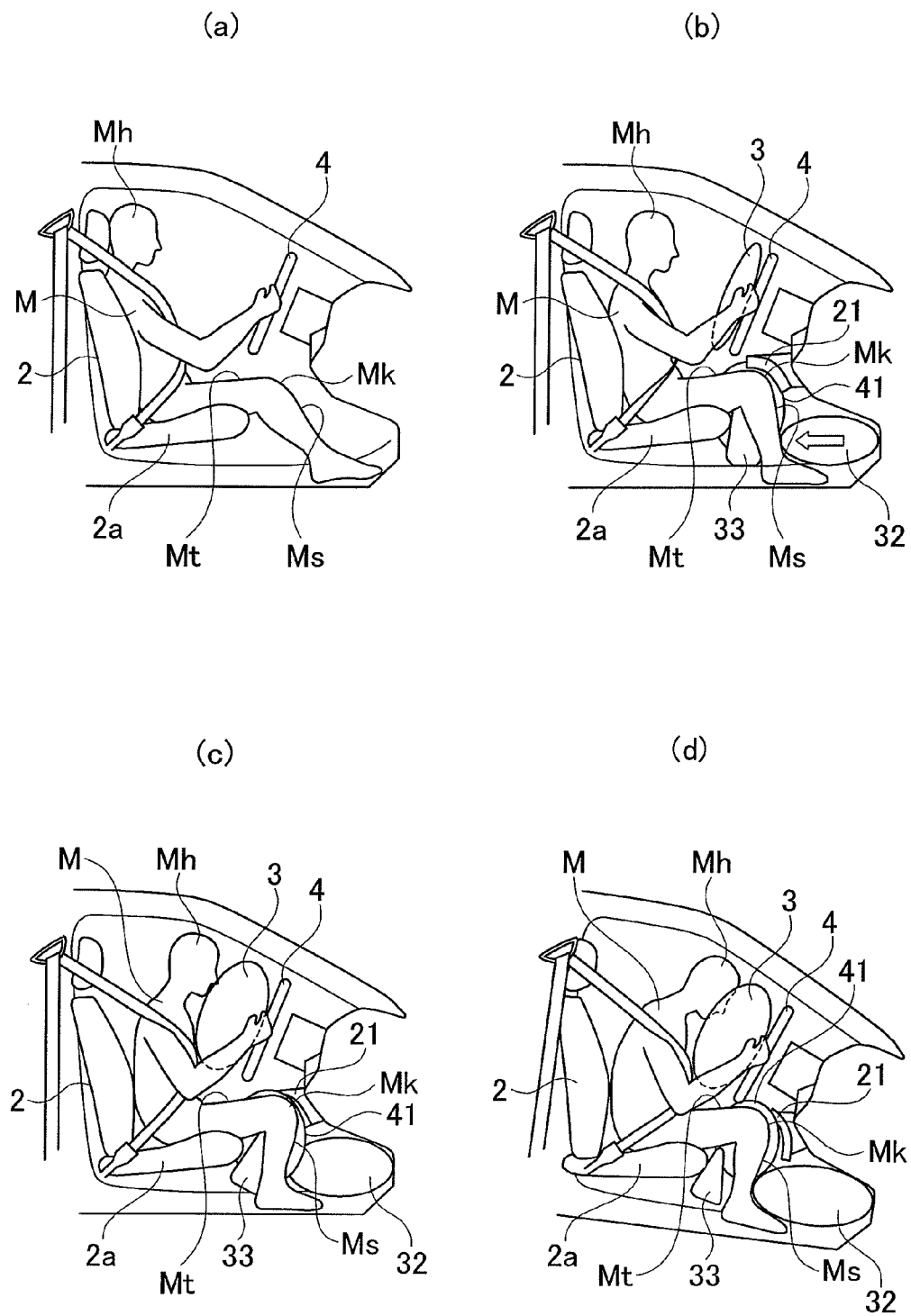
FIG. 7 is a series of simplified side elevational views illustrating in a sequential manner the operating procedure of the vehicle passenger restraining apparatus in accordance with the first embodiment.

As the deformation of the vehicle body progresses further and the lower section 7a of the dashboard 7 moves rearward as shown in diagram (c) of FIG. 7, the groin spreading air bag 41, the shin restraining device 31, and the knee restraining air bag 21 act to secure the groin angle $\theta 3$, the waist angle $\theta 2$, and the knee angle $\theta 1$ of the passenger M at prescribed angles. As a result, the posture of the upper body of the passenger M is stabilized as the passenger M begins to contact the air bag 3 of the steering wheel 4 in a forward-leaning manner due to inertia.

When the deformation reaches the vehicle cabin as shown in diagram (d) of FIG. 7, the amount by which the passenger M leans forward due to inertia increases. However, since the groin angle $\theta 3$, the waist angle $\theta 2$, and the knee angle $\theta 1$ of the passenger M are fixed, the amount of forward leaning is suppressed and the posture of the upper body of the passenger M is stabilized. As a result, the portion of the passenger M that contacts the air bag 3 is substantially constant and the amount of misalignment is reduced.

Figure 8:
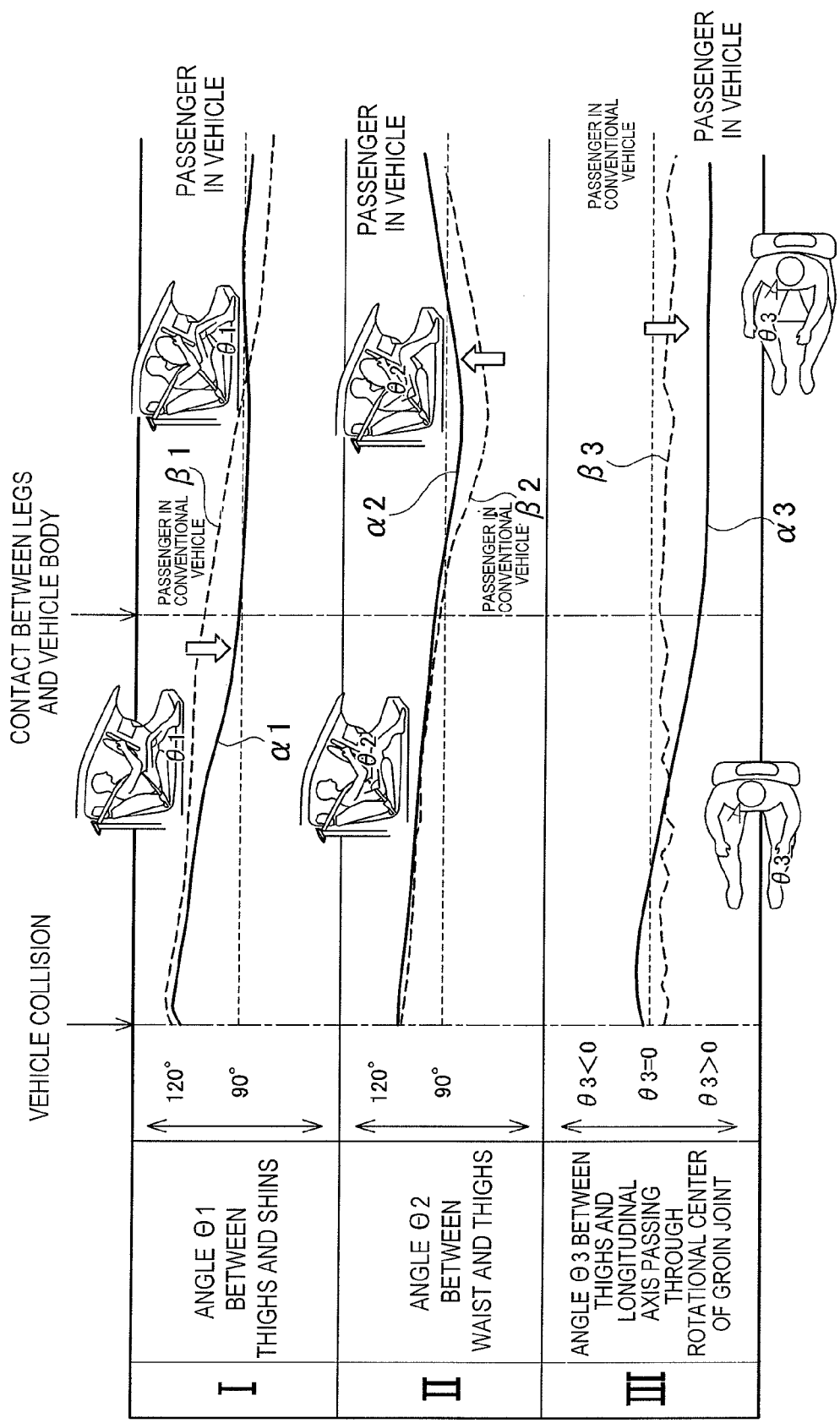
FIG. 8 is a time characteristic diagram comparing changes in the knee angle $\theta 1$, the waist angle $\theta 2$, and the groin angle $\theta 3$ during a frontal collision between the vehicle passenger restraining apparatus in accordance with the first embodiment and a comparative restraining apparatus without the present invention.

FIG. 8 shows how the knee angle $\theta 1$, the waist angle $\theta 2$, and the groin angle $\theta 3$ of the passenger M change with time during a frontal collision for both this embodiment and a conventional passenger restraining apparatus. Section I shows the time characteristic curves for the knee angle $\theta 1$. Section II shows the time characteristic curves for the waist angle $\theta 2$. Section III shows the time characteristic curves for the groin angle $\theta 3$. The solid characteristic curves $\alpha 1$, $\alpha 2$, and $\alpha 3$ indicate the time characteristics of the embodiment of the present invention, while the broken-line characteristic curves $\beta 1$, $\beta 2$, and $\beta 3$ indicate the time characteristics of the comparative example. The comparative example (conventional passenger restraining apparatus) is not provided with any structure for controlling the knee angle, the waist angle or the groin angle.

Figure 9:
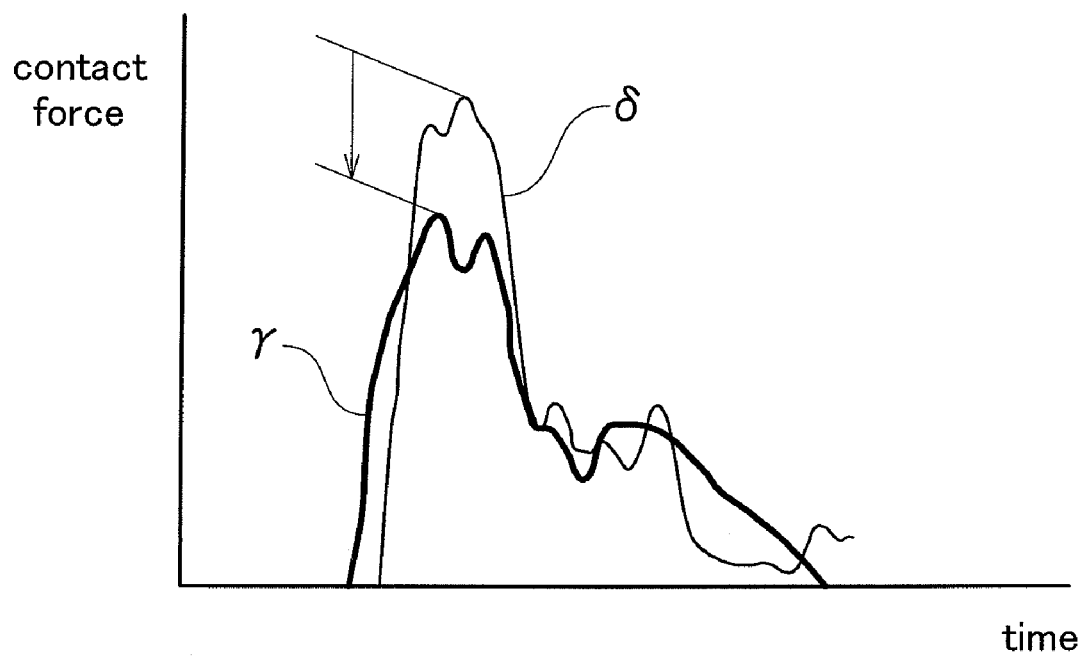
FIG. 9 is a time characteristic diagram comparing the contact pressure acting against the groin joint of the passenger during a frontal collision when the vehicle passenger restraining apparatus in accordance with the first embodiment with a conventional restraining apparatus.

During the stage after a front collision when the knees Mk of the passenger M contact the dashboard 7, the angle of the groin joint is larger when the embodiment of the present invention is employed than when a conventional structure (the comparative example) is used, i.e., a structure that does not have any structure for controlling the knee angle, the waist angle or the groin angle. Consequently, the embodiment of the present invention achieves the effect of causing the passenger M to maintain the same posture during the collision as the passenger M had before the collision. Additionally, the contact pressure acting on the groin joint is lower when the embodiment of the present invention is used than when the comparative example is used, as indicated in FIG. 9. In FIG. 9, the characteristic curve $\gamma$ indicates the contact pressure resulting when the embodiment of the present invention is used and the characteristic curve 6 indicates the contact pressure resulting when the comparative example is used.

With the vehicle passenger restraining apparatus 10 and the passenger restraining method in accordance with this embodiment, when the vehicle 1 undergoes a frontal collision, the knee angle restraining structure 20, the shin restraining structure 30, and the groin angle restraining structure 40 each operate such that the passenger can be restrained while controlling the knee angle $\theta 1$ made by a thigh Mt and a shin Ms of the passenger M, the waist angle $\theta 2$ made by the waist Mw and the thighs Mt of the passenger M, and the groin angle $\theta 3$ made by the thighs Mt with respect to a longitudinal axis passing Pm through the rotational center To of the groin joint of the passenger M.

By controlling the knee angle $\theta 1$, the waist angle $\theta 2$, and the groin angle $\theta 3$, the passenger M can be restrained such that the upper body does not bend greatly toward the front of the vehicle and the overall sitting posture of the passenger M is held stable. As a result, the air bag 3 existing toward the front of the vehicle relative to the passenger M can restrain the head Mh of the passenger M in a more reliable manner.

With this embodiment, the knees Mk of the passenger M can be restrained in a reliable manner because the knee angle restraining structure 20 includes the knee restraining pads 21 that restrain an upper surface of the knee-ward end of the thighs Mt and a frontward surface of the knee-ward end of the shins Ms. As a result, movement of the passenger M in the frontward and upward directions can be restrained while controlling the knee angle $\theta 1$ and movement of the thighs Mt can be restrained reliably.

With this embodiment, the shin restraining structure 30 includes the shin restraining device 31 that moves the shins toward the rear of the vehicle by a prescribed amount. Since the shin restraining device 31 restrains the shins Ms in a shock absorbing manner as it inflates and expands, the shins Ms of the passenger M can be restrained without being hurt.

With this embodiment, the groin angle restraining structure 40 includes the groin spreading air bag 41 that pushes the knees Mk of the passenger M apart by a prescribed amount. Since the groin spreading air bag 41 spreads the left and right thighs Mt of the passenger M apart in a shock absorbing manner as it inflates and expands, the thighs Mt can be spread without being hurt.

In this embodiment, the shin restraining device 31 includes the front restraining air bag 32 that contact frontward surfaces of the shins Ms and the rear restraining air bag 33 that contacts the rearward surfaces of the shins Ms. Since the front and rear restraining air bags 32 and 33 serve to pinch the shins Ms from the front and rear in the longitudinal direction of the vehicle, the shins Ms can be restrained in a stable manner.

With this embodiment, since the restraining structures 20, 30 and 40 are provided with an impact energy absorbing function, the impacts with the passenger M, which occur when during their operation, are softened to minimize injuring the passenger M.

With this embodiment, the vehicle undergoes a frontal collision, the groin angle restraining structure 40, the shin restraining structure 30, and the knee angle restraining structure 20 operate in order as listed. In other words, the groin angle restraining structure 40 operates first, the shin restraining structure 30 operates next, and the knee angle restraining structure 20 operates last. As a result, the waist angle θ2 can be determined from a state in which the groin angle θ3 is already determined and the knee angle θ1 can be determined first. As a result, the thighs Mt of the passenger M can be restrained after the positions of the legs have been stabilized and the burden placed on the passenger M in a high-speed frontal collision can be reduced.

With this embodiment, when the vehicle undergoes a frontal collision, the knee restraining pads 21 of the knee angle restraining structure 20 contact the frontward surfaces of the knee-ward ends of the shins Ms first and then contact the upper surfaces of the knee-ward ends of the thighs Mt. Thus, since the knee restraining pads 21 contact the passenger's legs in an order that follows the behavior of the passenger M during a frontal collision, the burden placed on the passenger M can be reduced and a reliable restraining action can be obtained.

With this embodiment, the front restraining air bag 32 is arranged in a frontward lower portion of the vehicle cabin. Thus, when a frontal collision occurs, the inflation and expansion of the front restraining air bag 32 can push the shins Ms toward the rear of the vehicle while suppressing the behavior that the shins Ms exhibit due to the forward oriented inertial forces acting on the shins Ms. As a result, the shins Ms can be controlled to the targeted positions in a reliable fashion.

With this embodiment, the rear restraining air bag 33 is arranged under a frontward portion of the seat cushion 2a of the front seat 2. Consequently, the rear restraining air bag 33 can inflate and expand from a position that is close to the shins Ms and contact the rear sides of the shins Ms in a rapid manner. Thus, this arrangement enables the shins Ms to be restrained very quickly.

Figure 10:
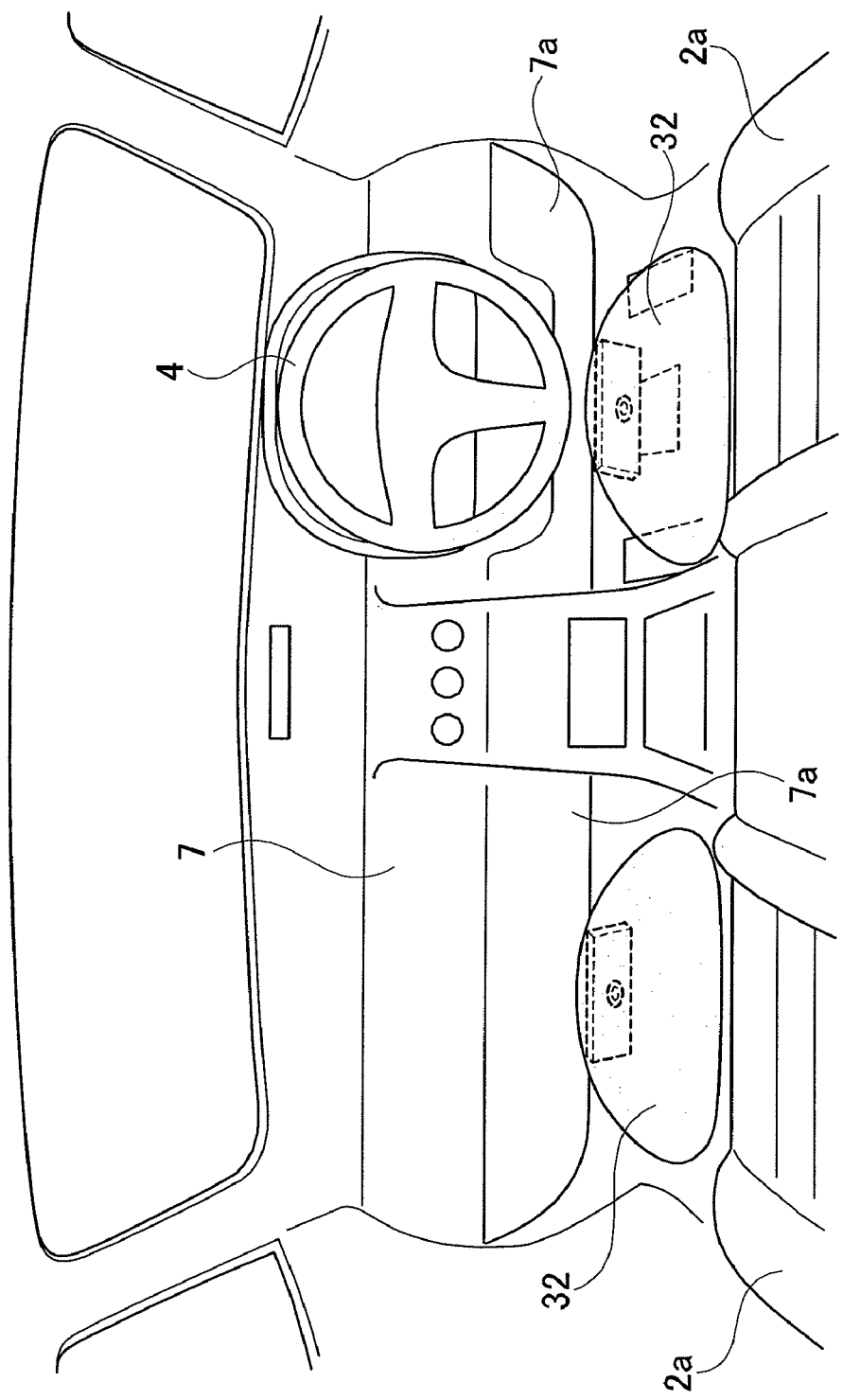
FIG. 10 is a simplified perspective view showing the front of the cabin from the rear in a vehicle equipped with a first variation of the first embodiment.

FIG. 10 is a perspective view showing the front of the cabin from the rear in a vehicle equipped with a first variation of the first embodiment. In this variation, the front restraining air bag 32 of the shin restraining device 31 is mounted in a lower section 7a of the dashboard 7. The first variation is used with in conjunction with the other structures of the first embodiment and provides the same operational effects as the first embodiment. Thus, this first variation of the first embodiment will not be discussed or illustrated in more detail and similar parts are given the same reference number.

Figure 11:
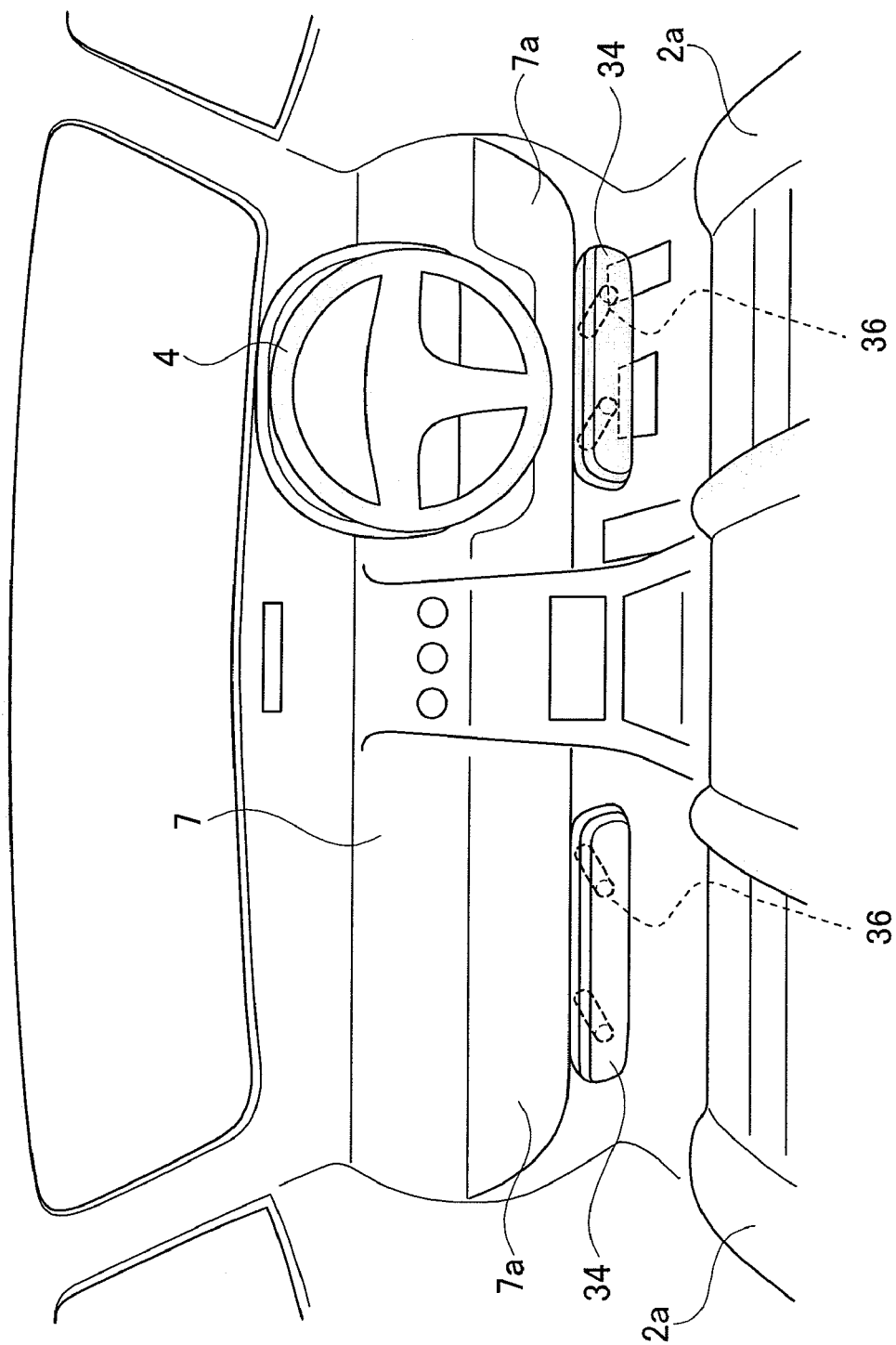
FIG. 11 is a simplified perspective view showing the front of the cabin from the rear in a vehicle equipped with a second variation of the first embodiment.

FIG. 11 is a perspective view showing the front of the cabin from the rear in a vehicle equipped with a second variation of the first embodiment. In this variation, the front restraining air bag 32 is replaced with a front restraining pad 34. The front restraining pad 34 is mounted in a lower section 7a of the dashboard 7. When a frontal collision occurs, the front restraining pads 34 are each projected rearward by a pair of extendable devices or actuator 36 (also see FIG. 16) so as to displace the shins Ms of the passenger M rearward. The second variation is used with in conjunction with the other structures of the first embodiment and provides the same operational effects as the first embodiment. Thus, this second variation of the first embodiment will not be discussed or illustrated in more detail and similar parts are given the same reference number.

Figure 12:
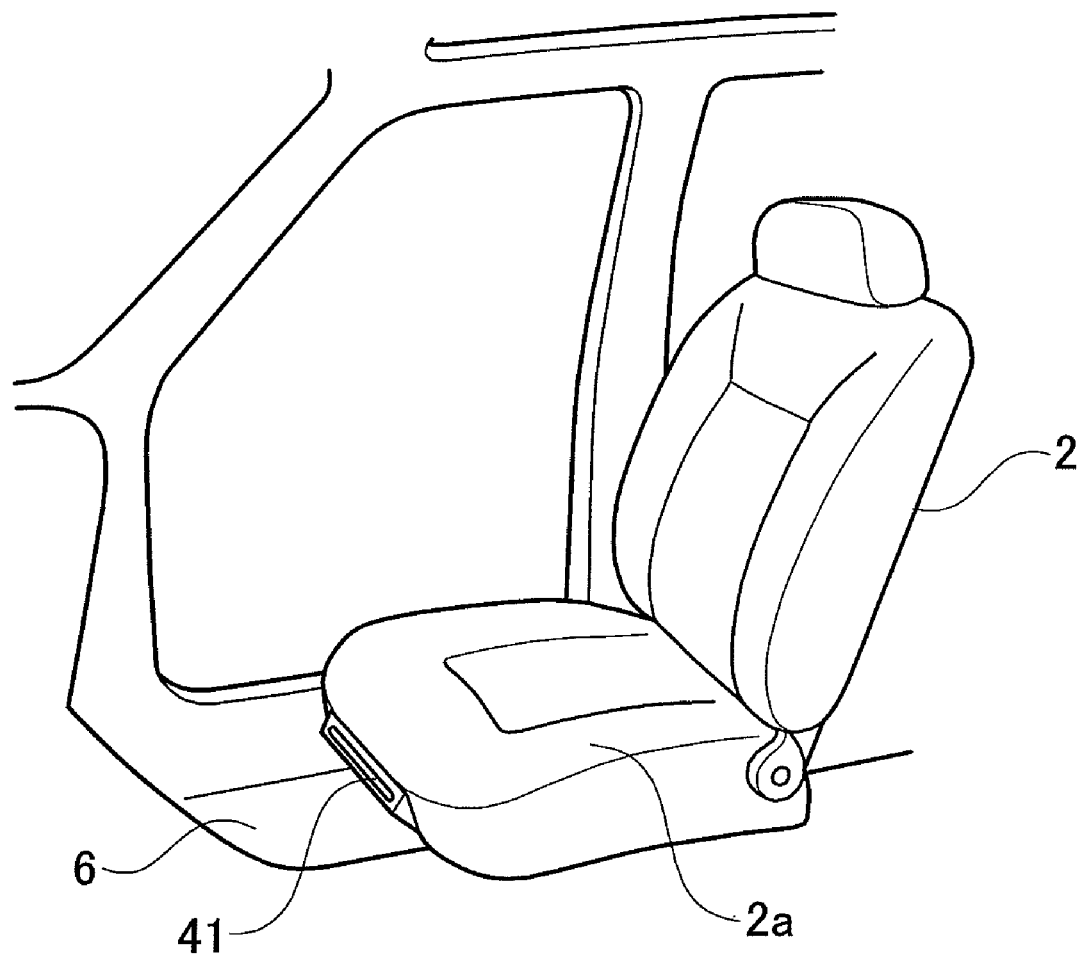
FIG. 12 is a simplified perspective view of a front seat equipped with a third variation of the first embodiment is mounted.

FIG. 12 is a perspective view of the front seat of a vehicle equipped with a third variation of the first embodiment. In this variation, the groin spreading air bag 41 is mounted to a frontward end portion of a frame of the seat cushion 2a of the front seat 2. The third variation is used with in conjunction with the other structures of the first embodiment and provides the same operational effects as the first embodiment. Thus, this third variation of the first embodiment will not be discussed or illustrated in more detail and similar parts are given the same reference number.

Figure 13:
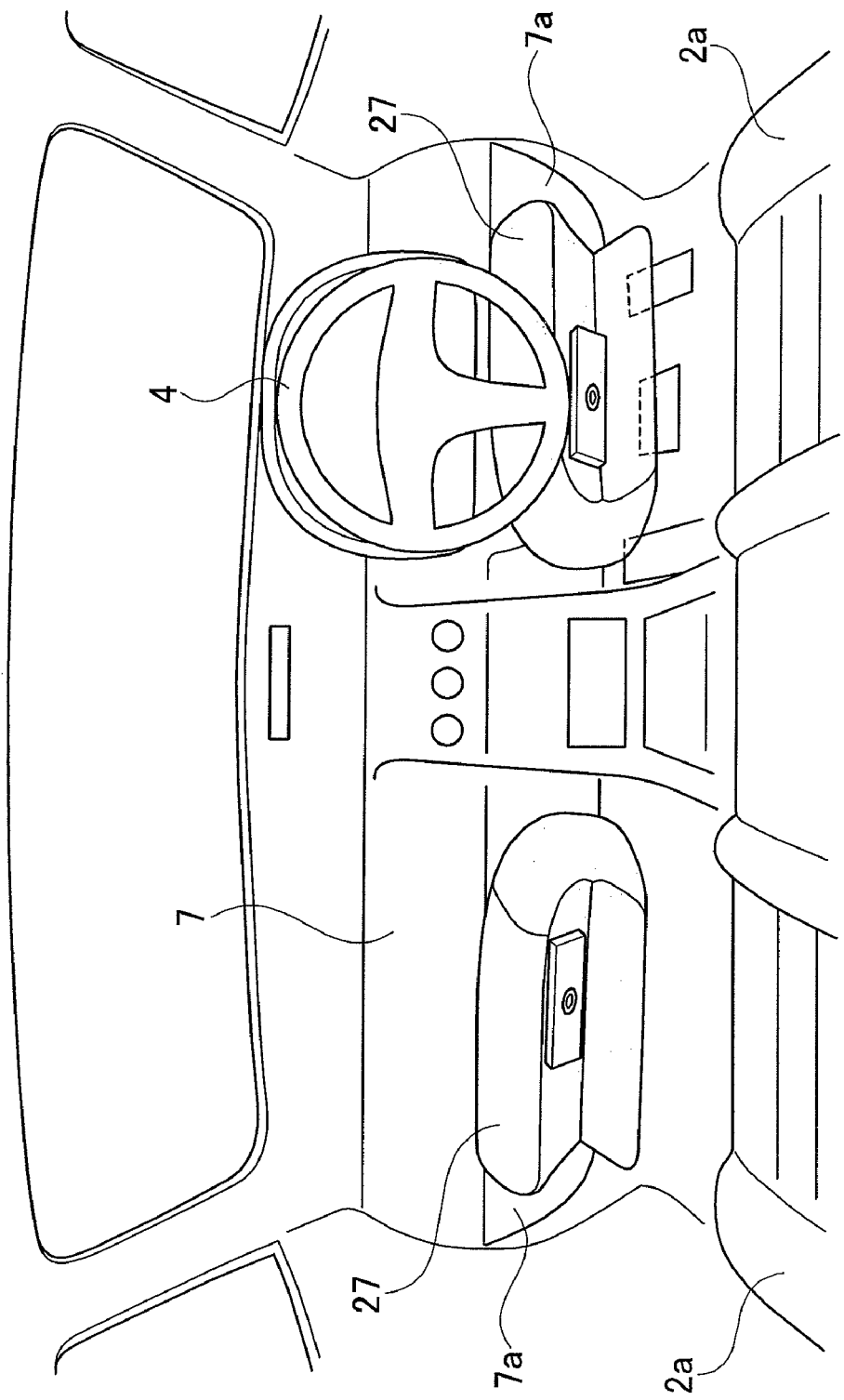
FIG. 13 is a simplified perspective view showing the front of the cabin from the rear in a vehicle equipped with a fourth variation of the first embodiment.

FIG. 13 is a perspective view showing the front of the cabin from the rear in a vehicle equipped with a fourth variation of the first embodiment. In this variation, the knee angle restraining structure 20 is a knee restraining air bag 27 that is mounted in a lower section 7a of the dashboard 7 and configured to have an L-shaped cross sectional shape when inflated. When a frontal collision occurs, the knee restraining air bag 27 inflates and expands so as to restrain the upper surfaces of the knee-ward ends of the thighs Mt and the frontward surfaces of the knee-ward ends of the shins Ms. The fourth variation is used in conjunction with the other structures of the first embodiment and provides the same operational effects as the first embodiment. Thus, this fourth variation of the first embodiment will not be discussed or illustrated in more detail and similar parts are given the same reference number.

Figure 14:
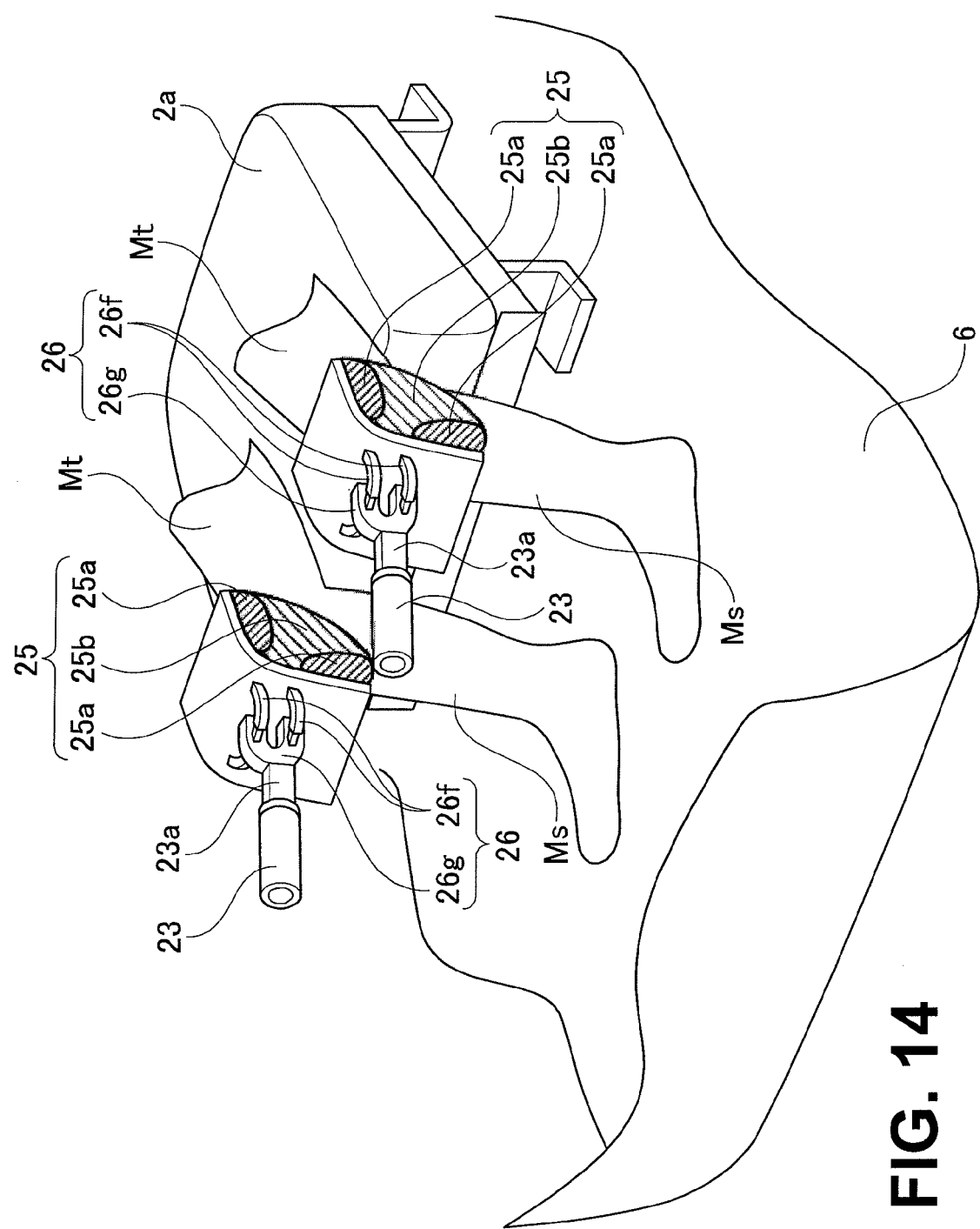
FIG. 14 is a simplified perspective view showing the legs of the passenger from the front in a vehicle equipped with a fifth variation of the first embodiment.

FIG. 14 is a perspective view showing the legs of the passenger from the front in a vehicle equipped with a fifth variation of the first embodiment. In this variation, the cushion 25 of each of the knee restraining pads 21 of the knee angle restraining structure 20 includes a low-rigidity cushion material 25a and a high-rigidity cushion 25b. The low-rigidity cushion material 25a forms the upper and lower ends of the cushion 25. The high-rigidity cushion 25b forms a middle section of the cushion 25. Meanwhile, each of the hinges 26 of the knee restraining pads 21 includes a pair of upper and lower connecting parts 26f and a connecting bracket 26g. The upper and lower connecting parts 26f have generally U-shaped forms arranged along the widthwise direction of the vehicle. The connecting bracket 26g is connected to the tip end of the rod 23a of the extendable device 23. The connecting bracket 26g engages the two connecting parts 26f in a freely slidable manner. The fifth variation is used with in conjunction with the other structures of the first embodiment and provides the same operational effects as the first embodiment. Thus, this fifth variation of the first embodiment will not be discussed or illustrated in more detail and similar parts are given the same reference number.

Additionally, with the fifth variation, when the passenger's knees Mk contact the knee restraining pads 21 in laterally diagonal direction (a direction that is horizontally divergent from the frontward direction), the knee restraining pads 21 rock in to the left or right in the widthwise direction of the vehicle such that they can properly restrain the passenger's knees Mk.

Figure 15:
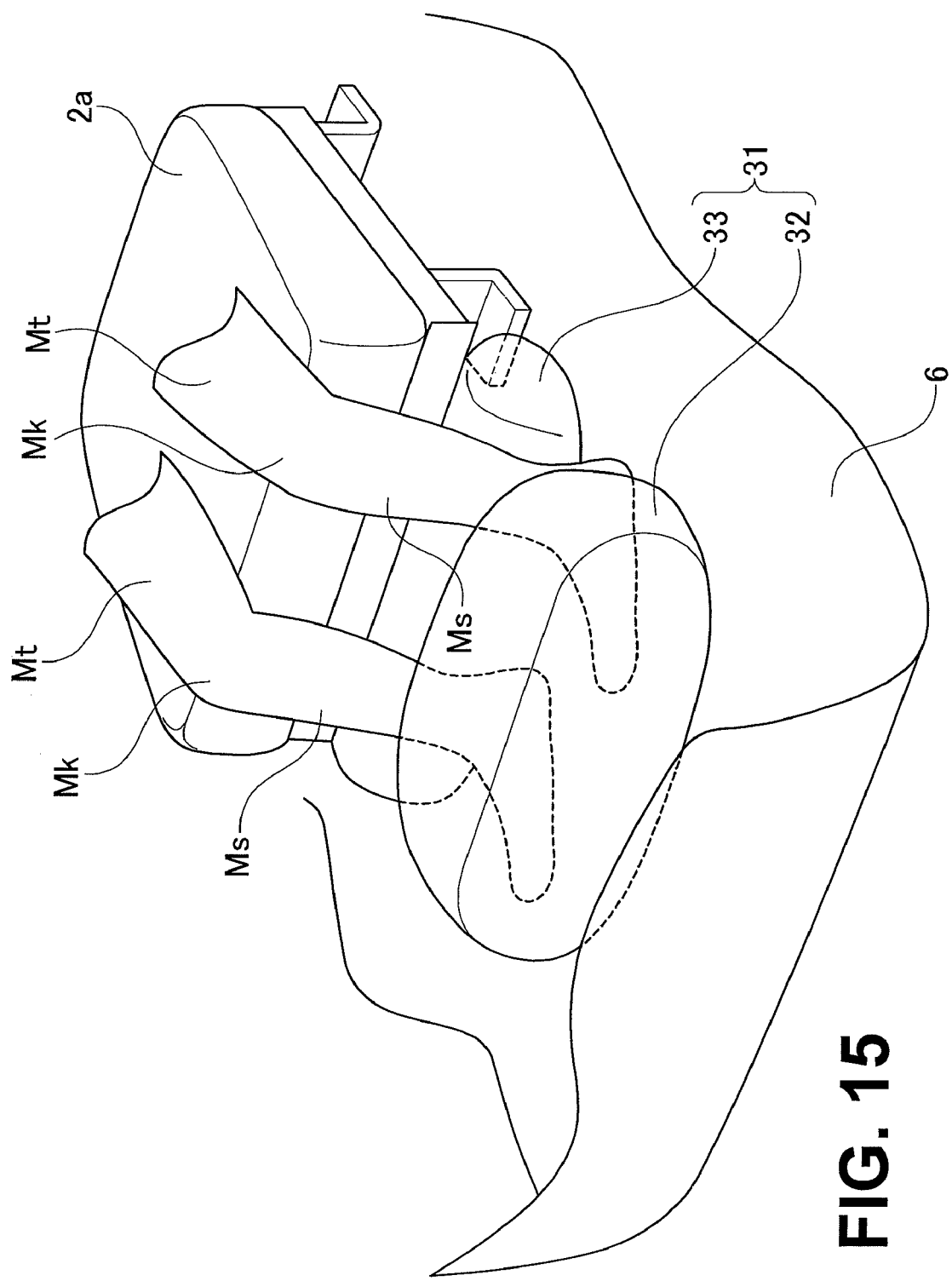
FIG. 15 is a simplified perspective view showing the legs of the passenger from the front in a vehicle equipped with a sixth variation of the first embodiment.

FIG. 15 is a perspective view showing the legs of the passenger from the front in a vehicle equipped with a sixth variation of the first embodiment. In this variation, similarly to the first embodiment, the shin restraining device 31 of the shin restraining structure includes the front restraining air bag 32 and the rear restraining air bag 33. However, in this variation, the front restraining air bag 32 is arranged on the frontward end of the floor panel 6 and the rear restraining air bag 33 is mounted to the front seat 2, i.e., arranged near the front end of the mounting part of the seat cushion 2a. The sixth variation is used with in conjunction with the other structures of the first embodiment and provides the same operational effects as the first embodiment. Thus, this sixth variation of the first embodiment will not be discussed or illustrated in more detail and similar parts are given the same reference number.

Figure 16:
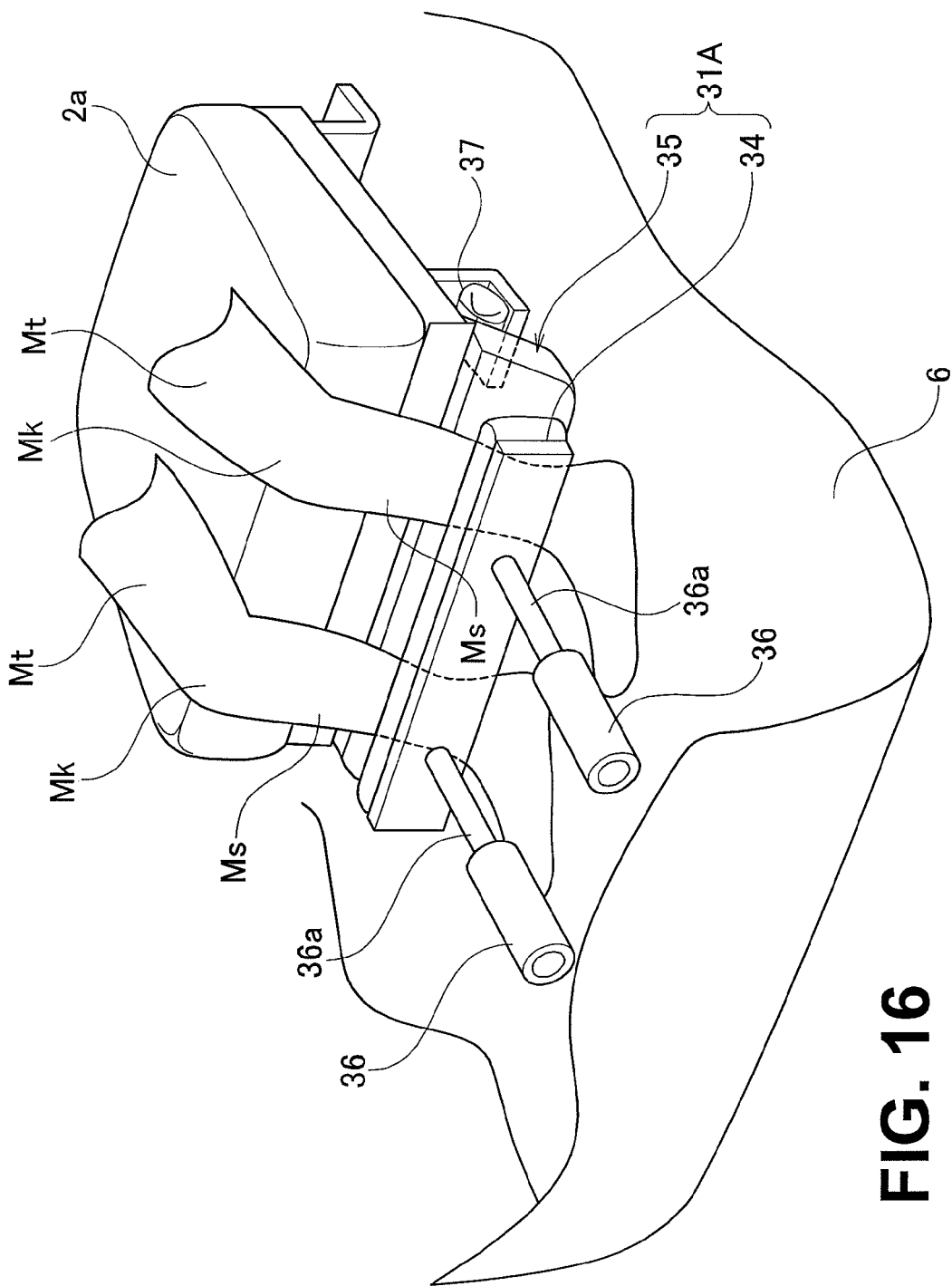
FIG. 16 is a simplified perspective view showing the legs of the passenger from the front in a vehicle equipped with a seventh variation of the first embodiment.

FIG. 16 is a perspective view showing the legs of the passenger from the front in a vehicle equipped with a seventh variation of the first embodiment. In this variation, the shin restraining structure is a shin restraining pad 31A that comprises a front restraining pad 34 and a rear restraining pad 35. The front restraining pad 34 serves as a front restraining part for contacting a frontward surface of the shins Ms. The rear restraining pad 35 serves as a rear restraining part for contacting a rearward surface of the shins Ms. The front and rear restraining pads 34 and 35 pinch the shins Ms of the passenger M in the longitudinal direction of the vehicle.

The front restraining pad 34 is mounted to a tip end portion of the piston rods 36a of the extendable devices or actuators 36 that operate using a gas supplied from an inflator (not shown) when a frontal collision occurs. The rear restraining pad 35 is mounted to the frontward side of an air bag 37 arranged in a frontward end portion of a mounting section of the seat cushion 2a. The air bag 37 deploys and inflates using a gas supplied from an inflator (not shown) when a frontal collision occurs. The seventh variation is used with in conjunction with the other structures of the first embodiment and provides the same operational effects as the first embodiment. Thus, this seventh variation of the first embodiment will not be discussed or illustrated in more detail and similar parts are given the same reference number.

Figure 17:
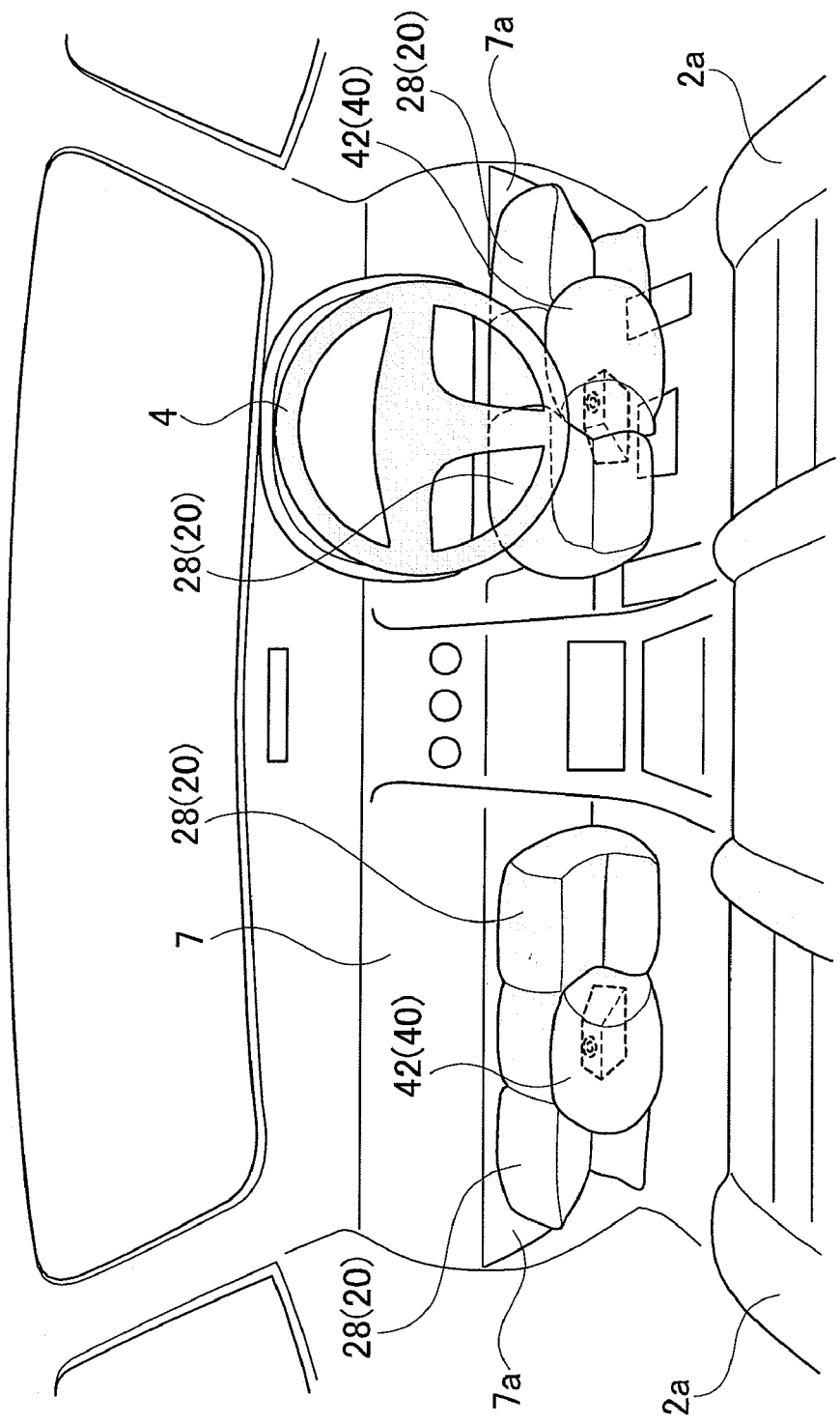
FIG. 17 is a simplified perspective view showing the front of the cabin from the rear in a vehicle equipped with a passenger restraining apparatus in accordance with a second embodiment.

FIG. 17 shows a second embodiment. Parts of the second embodiment that are the same as the parts of the first embodiment are indicated with the same reference numerals and explanations thereof are omitted for the sake of brevity. FIG. 17 is a perspective view showing the front portion of the vehicle cabin from the rear.

This second embodiment has basically the same constituent features as the first embodiment (see FIG. 2). This second embodiment only differs from the first embodiment in that the configuration of the knee angle restraining structure 20 and the groin angle restraining structure 40 have been modified. Thus, the shin restraining structure 30 is the same as the first embodiment or any of its variations discussed above. Thus, the knee angle restraining structure 20 restrains the passenger M while controlling the knee angle θ1 during a frontal collision. The shin restraining structure 30 restrains the passenger M while controlling the waist angle θ2 during a frontal collision. The groin angle restraining structure 40 restrains the passenger M while controlling the groin angle θ3.

In this second embodiment, the knee angle restraining structure 20 includes a pair of knee restraining air bags 28 and the groin angle restraining structure 40 includes a groin spreading air bag 42. The air bags 28 and 42 are connected together and arranged in front of the seats 2.

More specifically, the groin spreading air bag 42 is arranged in the middle of the knee restraining air bags 28. Thus, the knee restraining air bags 28 are arranged on both sides of the groin spreading air bag 42 such that the three air bags 28 and 42 are aligned along the widthwise direction of the vehicle. The three air bags 28 and 42 are preferably connected together as an integral unit.

When a frontal collision occurs, gas pressure supplied from an inflator (not shown) first inflates the groin spreading air bag 42 and then inflates the two knee restraining air bags 28 after the groin spreading air bag 42 has expanded. Thus, first the groin spreading air bag 42 enters between the left and right thighs Mt and pushes the knees Mk apart and then, afterwards, the knee restraining air bags 28 restrain the upper surfaces of the knee-ward ends of the thighs Mt and the frontward surfaces of the knee-ward ends of the shins Ms.

A passenger restraining apparatus in accordance with this embodiment provides the same operational effects as the first embodiment. Additionally, since the knee retraining air bags 28 and the groin spreading air bag 42 are connected together, the knee restraining air bags 28 and the groin spreading air bag 42 can be installed as a single integral unit, thus simplifying the installation.

Figure 18:
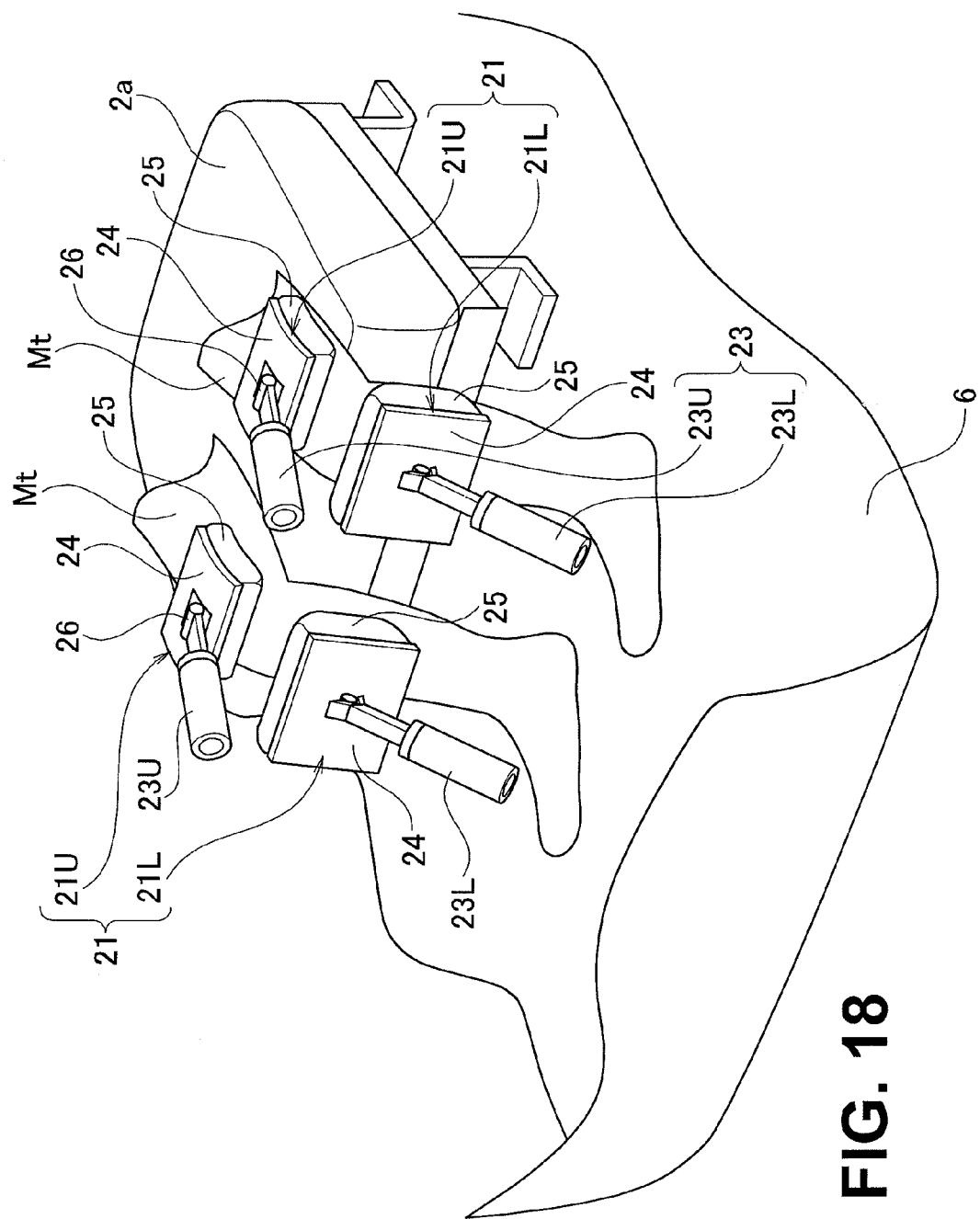
FIG. 18 is a simplified perspective view showing the legs of the passenger from the front in a vehicle equipped with a passenger restraining apparatus in accordance with a third embodiment.

FIG. 18 shows a third embodiment. Parts of the third embodiment that are the same as the parts of the first embodiment are indicated with the same reference numerals and explanations thereof are omitted for the sake of brevity. FIG. 18 is a perspective view showing the legs of the passenger from the front.

Similarly to the second embodiment, this third embodiment has basically the same constituent features as the first embodiment (see FIG. 2). This third embodiment only differs from the first embodiment in that the configuration of the knee angle restraining structure 20 has been modified. Thus, the shin restraining structure 30 and the groin angle restraining structure 40 are the same as the first embodiment or any of its variations discussed above. Thus, the knee angle restraining structure 20 restrains the passenger M while controlling the knee angle θ1 during a frontal collision. The shin restraining structure 30 restrains the passenger M while controlling the waist angle θ2 during a frontal collision. The groin angle restraining structure 40 restrains the passenger M while controlling the groin angle θ3.

A passenger restraining apparatus in accordance with this third embodiment is also similar in that the knee angle restraining structure 20 comprises a pair of the knee restraining pads 21. However, this embodiment is different from the first embodiment in that each of the knee restraining pads 21 comprises a pair of upper pads 21U and a pair of lower pads 21L. The upper pads 21U are configured and arranged contact an upper surface of a knee-ward end of the passenger's thigh Mt. The lower pads 21L are configured and arranged to contact a frontward surface of a knee-ward end of the passenger's shin Mt. The upper pads 21U and the lower pads 21L are separate from each other and can be operated independently of each other.

The upper pads 21U are each operated with an upper extendable device 23U, while each of the lower pads 21L are operated with a lower extendable device 23L. Each of the upper and lower pads 21U and 21L has a support member 24 that is connected to the respective one of the upper or lower extendable devices 23U or 23L by a hinge 26.

When a frontal collision occurs, the lower pads 21L are put into contact with the frontward surfaces of the knee-ward ends of the shins Ms first and, afterwards, the upper pads 21U are put into contact with the upper surfaces of the knee-ward ends of the thighs.

A passenger restraining apparatus in accordance with this embodiment provides the same operational effects as the first embodiment. However, in this embodiment, the knee angle restraining structure 20 has the upper pads 21U configured and arranged to be put into contact with upper surfaces of the knee-ward end portions of the thighs Mt separately from the lower pads 21L. With this configuration, since the knees Mk can be restrained in the vertical direction with the upper pads 21U and lower pads 21L, the knee angle θ1 can be adjusted more easily in accordance with the behavior exhibited by the passenger M when a front collision occurs. Additionally, when a frontal collision occurs, the upper pads 21U are put into contact with the upper surfaces of the knee-ward ends of the thighs after the lower pads 21L are put into contact with the frontal surface of the knee-ward ends of the shins Ms. Since the upper and lower pads 21U and 21L contact the passenger's legs in an order that follows the behavior of the passenger's legs during a frontal collision, the knees Mk can be restrained securely even when unexpected behavior occurs.

While only selected embodiments of the vehicle passenger restraining apparatus have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired as long as they do not depart from the present invention. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle passenger restraining apparatus comprising:
    a knee angle attaining structure configured to restrain a passenger during a frontal collision by contacting the passenger's knees to restrain the passenger's knees to a prescribed knee angle as measured between a passenger's thigh and a passenger's shin;
    a shin restraining structure configured to restrain the passenger during a frontal collision by moving the passenger's shins rearward and restraining the passenger's shins; and
    a groin angle attaining structure configured to restrain the passenger during a frontal collision by spreading the passenger's thighs to a prescribed groin angle as measured between the passenger's thigh and a longitudinal axis passing through a rotational center of a passenger's groin joint,
    the groin angle attaining structure, the shin restraining structure and the knee angle attaining structure being arranged to operate sequentially with the groin angle attaining structure operating first, the shin restraining structure operating second, and the knee angle attaining structure operating third during the frontal collision.

2. The vehicle passenger restraining apparatus as recited in claim 1, wherein
    the knee angle attaining structure includes at least one of an air bag and a pad arranged to restrain an upper surface of a knee-ward end of the passenger's thigh and a frontward surface of a knee-ward end of the passenger's shin.

3. The vehicle passenger restraining apparatus as recited in claim 2, wherein
    the knee angle attaining structure includes a knee restraining pad configured and arranged to first contact the frontward surface of the knee-ward end of the passenger's shin and then contact the upper surface of the knee-ward end of the passenger's thigh.

4. The vehicle passenger restraining apparatus as recited in claim 2, wherein
    the knee angle attaining structure comprises an upper pad and a lower pad, with the upper pad being moveable to contact the upper surface of the knee-ward end of the passenger's thigh and the lower pad being separately moveable with respect to the upper pad to contact the frontward surface of the knee-ward end of the passenger's shin.

5. The vehicle passenger restraining apparatus as recited in claim 4, wherein
    the upper and lower pads are moveably configured and arranged such that the lower pad contacts the frontward surface of the knee-ward end of the passenger's shin before the upper pad contacts the upper surface of the knee-ward end of the passenger's thigh.

6. The vehicle passenger restraining apparatus as recited in claim 1, wherein
    the shin restraining structure includes at least one of an air bag and a pad arranged to displace the shin in a rearward vehicle direction.

7. The vehicle passenger restraining apparatus as recited in claim 6, wherein
    the shin restraining structure includes a front restraining part configured and arranged to contact a frontward surface of the passenger's shin and a rear restraining part configured and arranged to contact a rearward surface of the passenger's shin, the front and rear restraining parts being configured and arranged to pinch the passenger's shin in a longitudinal vehicle direction.

8. The vehicle passenger restraining apparatus as recited in claim 7, wherein
    the front and rear restraining parts are arranged in at least one of a frontward lower cabin section and a lower dash section.

9. The vehicle passenger restraining apparatus as recited in claim 7, wherein
    the rear restraining part is arranged in a frontward position below a seat cushion.

10. The vehicle passenger restraining apparatus as recited in claim 1, wherein
    the groin angle attaining structure includes an air bag arranged to spread a passenger's knees by a prescribed amount.

11. The vehicle passenger restraining apparatus as recited in claim 1, wherein
the knee angle attaining structure includes a knee restraining air bag; and
the groin angle attaining structure includes a groin spreading air bag, the knee restraining air bag and the groin spreading air bag being connected together and arranged in front of a seat.

12. The vehicle passenger restraining apparatus as recited in claim 1, wherein
each of the knee angle attaining structure, the shin restraining structure, and the groin angle attaining structure is configured and arranged to absorb an impact energy of the passenger during the frontal collision.

13. A vehicle equipped with the passenger restraining apparatus as recited in claim 1, wherein
the passenger restraining apparatus is arranged in a vehicle cabin.

14. A vehicle passenger restraining apparatus comprising:
knee angle attaining means for restraining a passenger during a frontal collision by contacting the passenger's knees to restrain the passenger's knees to a prescribed knee angle as measured between a passenger's thigh and a passenger's shin;
shin restraining means for restraining the passenger during a frontal collision by moving the passenger's shins rearward and restraining the passenger's shins; and
groin angle attaining means for restraining the passenger during a frontal collision by spreading the passenger's thighs to a prescribed groin angle as measured between the passenger's thigh and a longitudinal axis passing through a rotational center of a passenger's groin joint,
the groin angle attaining means, the shin restraining means and the knee angle attaining means being arranged to operate sequentially with the groin angle attaining means operating first, the shin restraining means operating second, and the knee angle attaining means operating third during the frontal collision.

15. A vehicle passenger restraining method comprising:
restraining a passenger during a frontal collision by contacting the passenger's knees to restrain the passenger's knees to a prescribed knee angle as measured between a passenger's thigh and a passenger's shin;
restraining the passenger during a frontal collision by moving the passenger's shins rearward and restraining the passenger's shins,
restraining the passenger during a frontal collision by spreading the passenger's thighs to a prescribed groin angle as measured between the passenger's thigh and a longitudinal axis passing through a rotational center of a passenger's groin joint; and
operating sequentially the restraining of the passenger such that the spreading of the passenger's thighs occurs first, the moving of the passenger's shins occurs second, and the contacting of the passenger's knees occurs third during the frontal collision.

* * * * *